Figure 1:
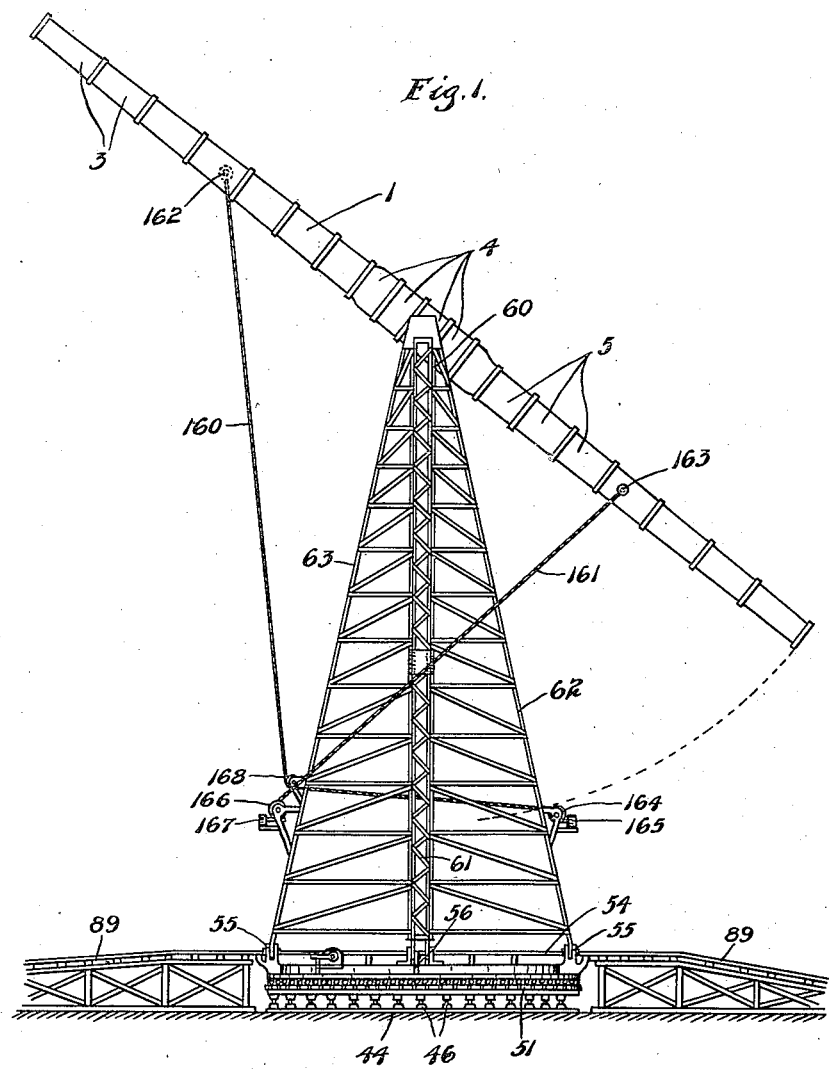

K. DOUGAN.
HEAVY ARTILLERY.
APPLICATION FILED APR. 26, 1915.

1,375,491.

Patented Apr. 19, 1921.
16 SHEETS—SHEET 2.

INVENTOR.
KENNEDY DOUGAN.
BY HIS ATTORNEY
James F. Williamson

K. DOUGAN.
HEAVY ARTILLERY.
APPLICATION FILED APR. 26, 1915.

1,375,491.

Patented Apr. 19, 1921.
16 SHEETS—SHEET 3.

INVENTOR
KENNEDY DOUGAN
BY HIS ATTORNEY
James F. Williamson

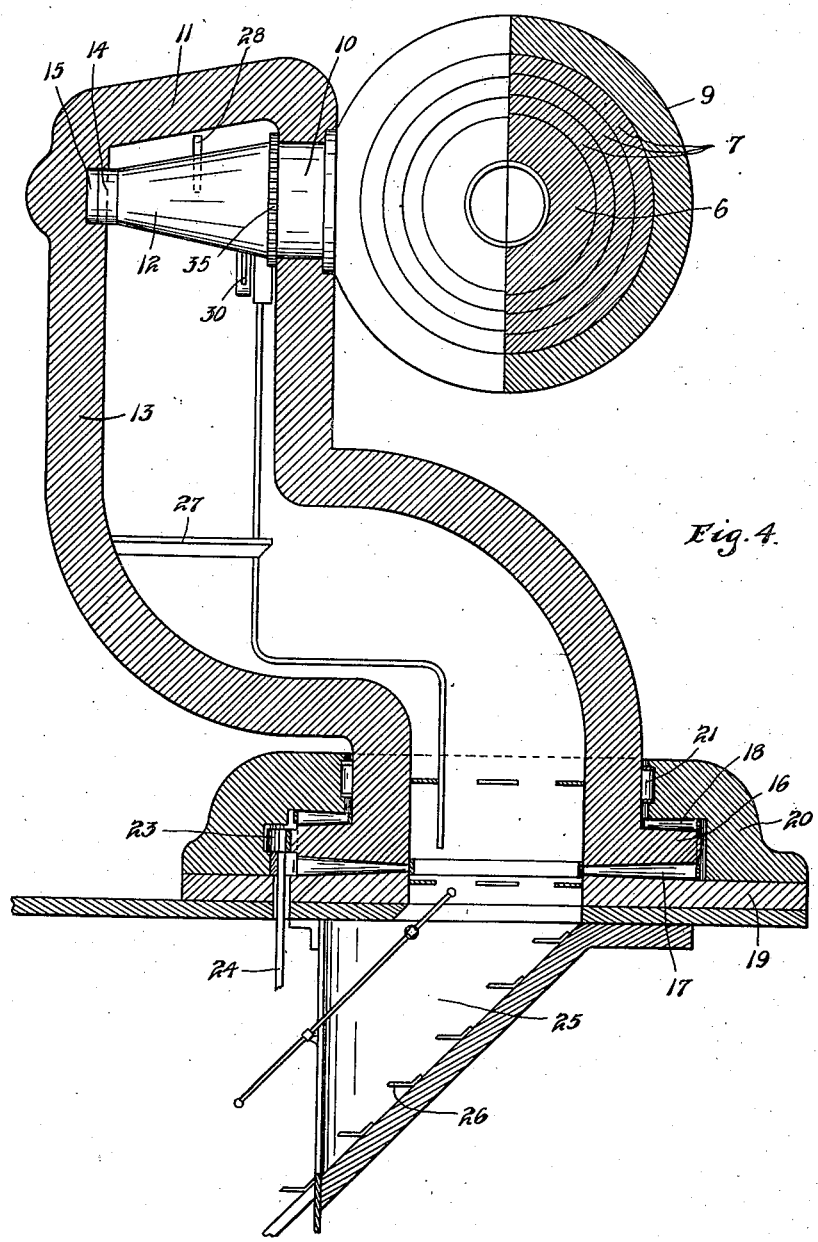

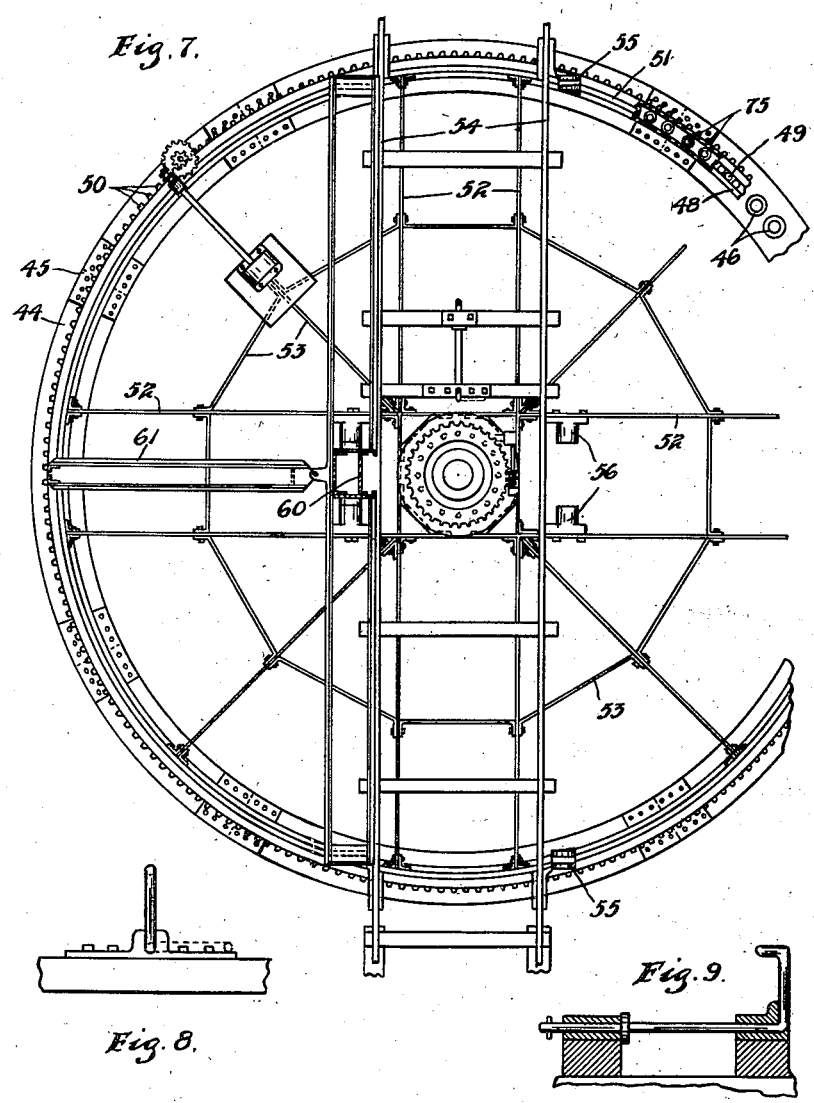

K. DOUGAN.
HEAVY ARTILLERY.
APPLICATION FILED APR. 26, 1915.
1,375,491.
Patented Apr. 19, 1921.
16 SHEETS—SHEET 6.
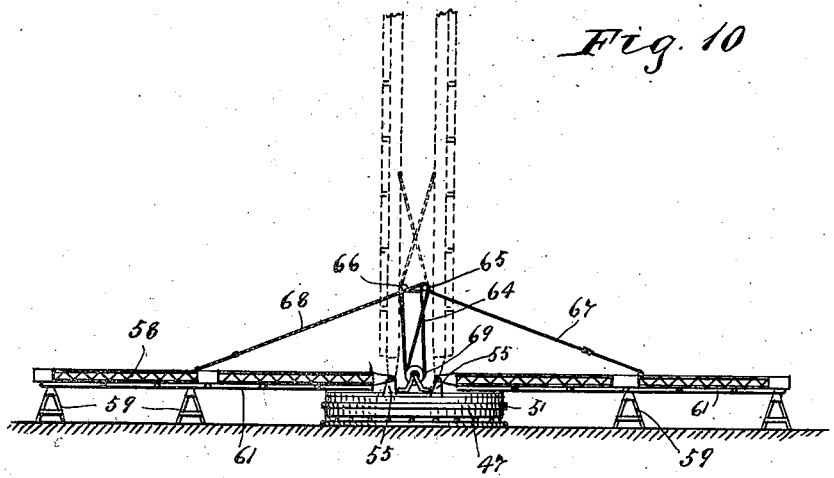
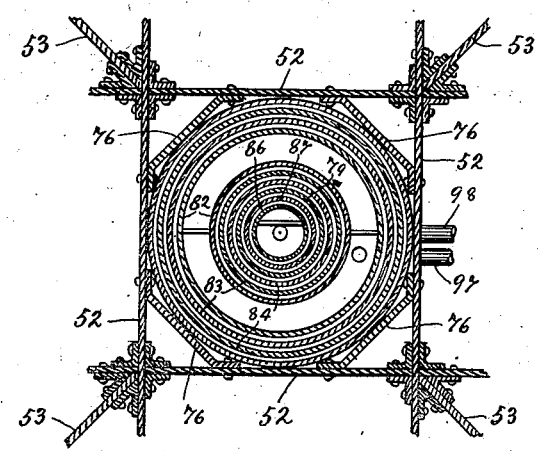
INVENTOR.
KENNEDY DOUGAN
BY H/S ATTORNEY

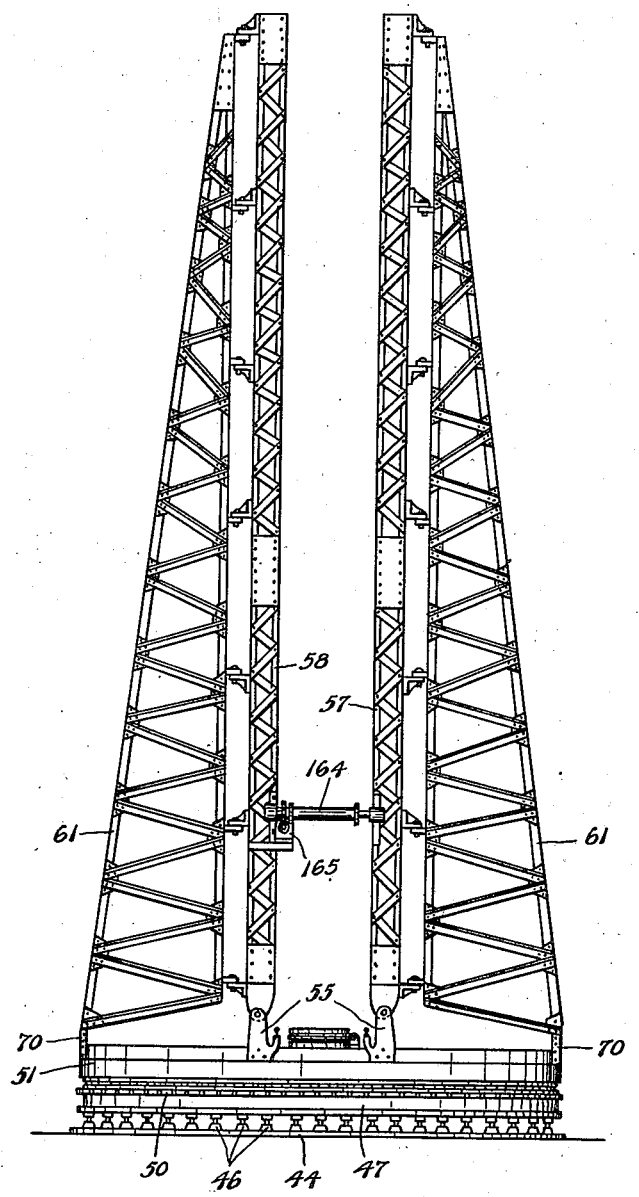

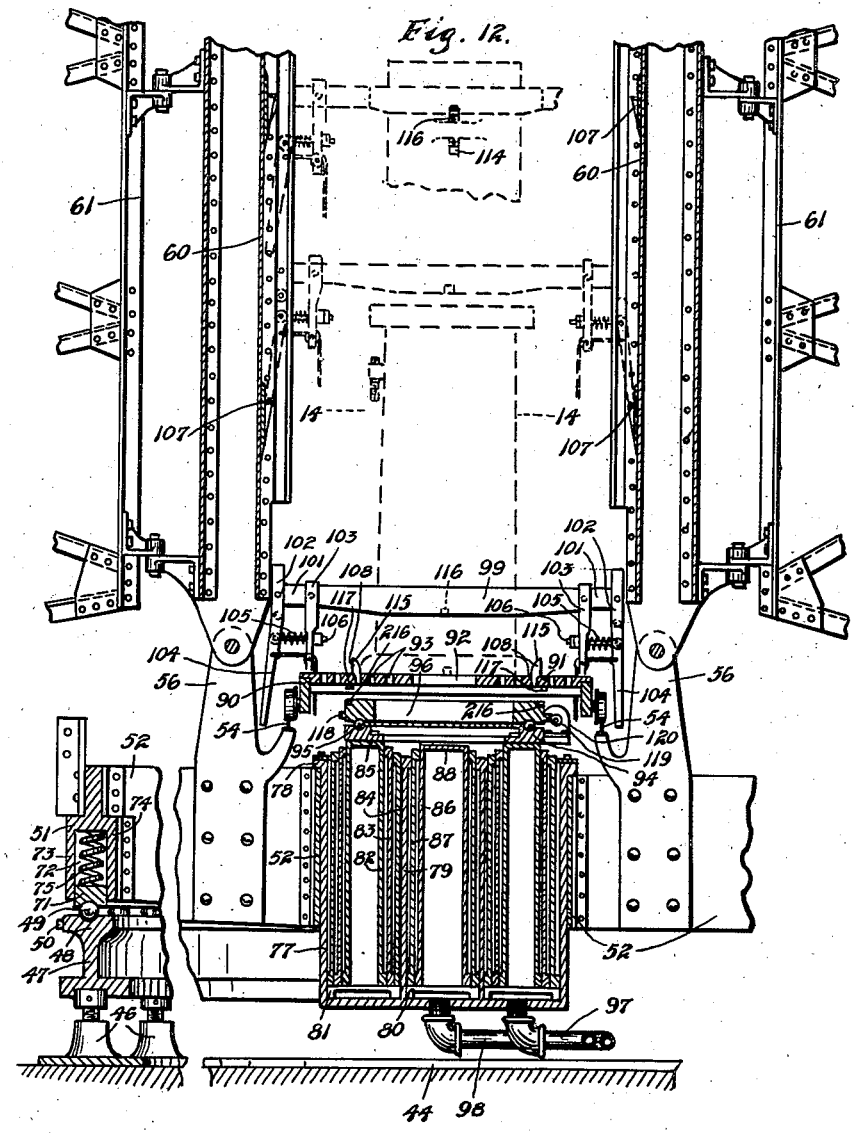

K. DOUGAN.
HEAVY ARTILLERY.
APPLICATION FILED APR. 26, 1915.
1,375,491.
Patented Apr. 19, 1921.
16 SHEETS—SHEET 9.
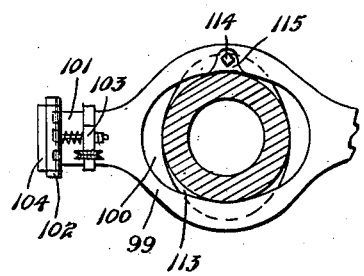
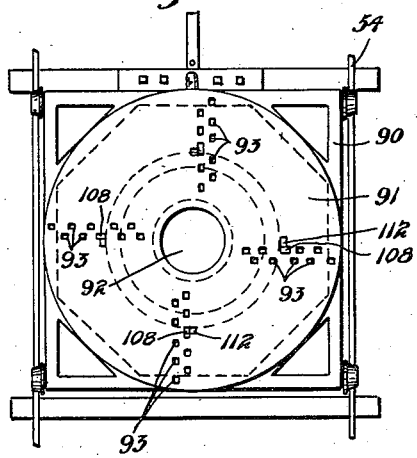
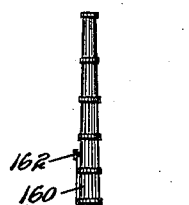
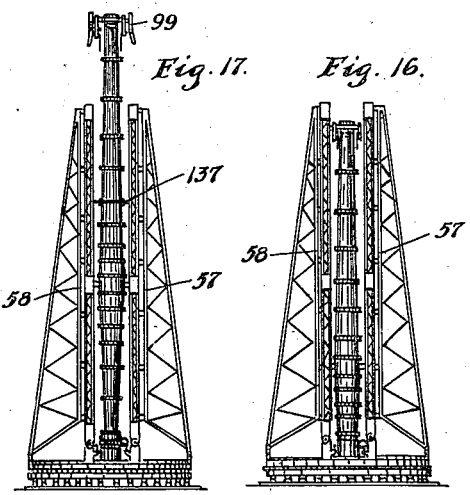
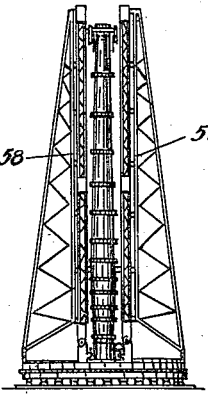
INVENTOR
KENNEDY DOUGAN.
BY HIS ATTORNEY.
James F. Williamson

K. DOUGAN.
HEAVY ARTILLERY.
APPLICATION FILED APR. 26, 1915.

1,375,491.

Patented Apr. 19, 1921.
16 SHEETS—SHEET 10.

INVENTOR.
KENNEDY DOUGAN
BY HIS ATTORNEY
James F. Williamson

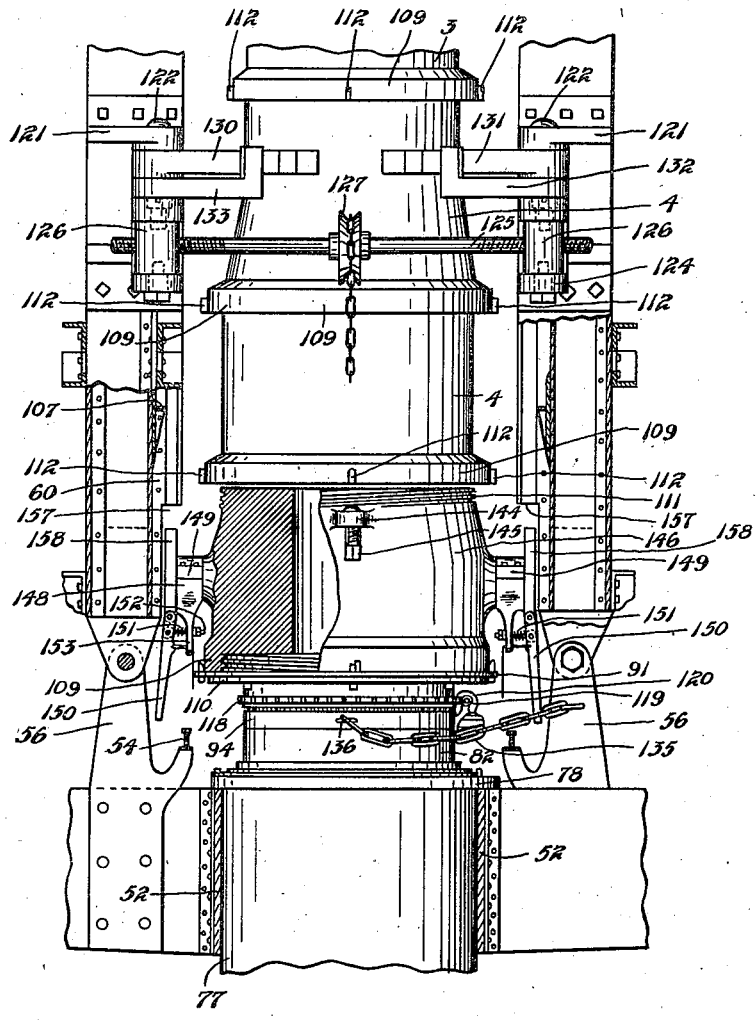

K. DOUGAN.
HEAVY ARTILLERY.
APPLICATION FILED APR. 26, 1915.
1,375,491.
Patented Apr. 19, 1921.
16 SHEETS—SHEET 12.
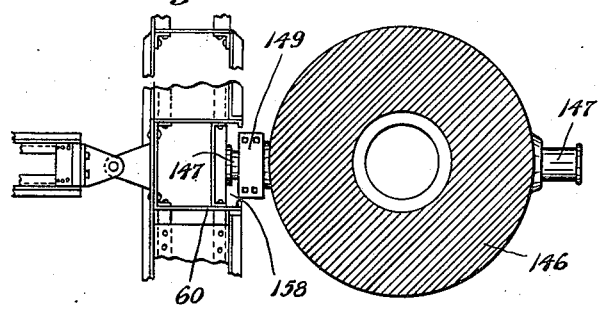
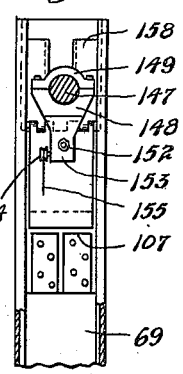
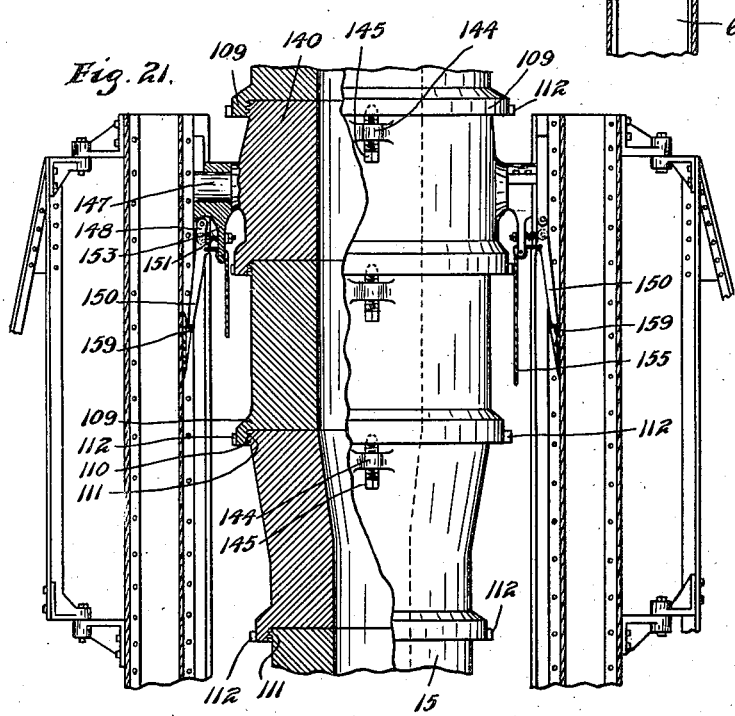
INVENTOR.
KENNEDY DOUGAN.
BY HIS ATTORNEY.
James F. Williamson K. DOUGAN.
HEAVY ARTILLERY.
APPLICATION FILED APR. 26, 1915.
1,375,491.
Patented Apr. 19, 1921.
16 SHEETS—SHEET 13.
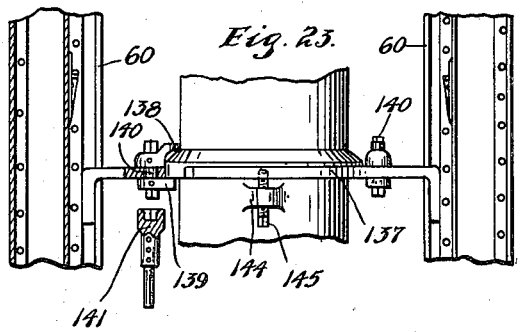
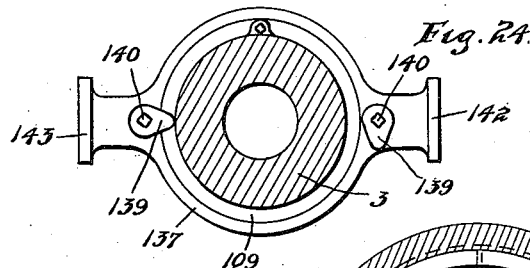
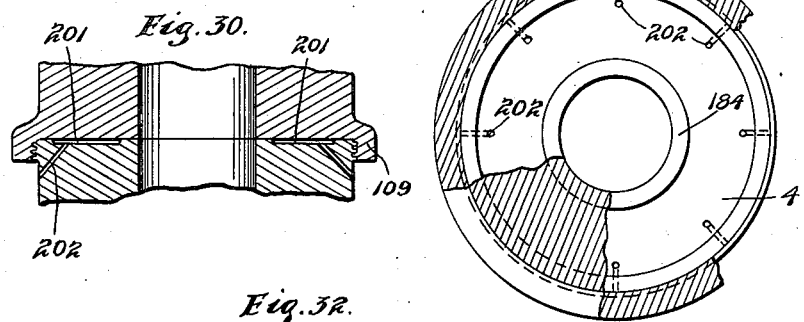
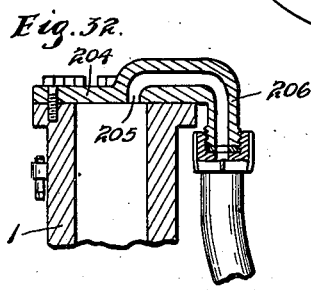
INVENTOR.
KENNEDY DOUGAN.
BY HIS ATTORNEY
James F. Williamson K. DOUGAN.
HEAVY ARTILLERY.
APPLICATION FILED APR. 26, 1915.
1,375,491.
Patented Apr. 19, 1921.
16 SHEETS—SHEET 14.
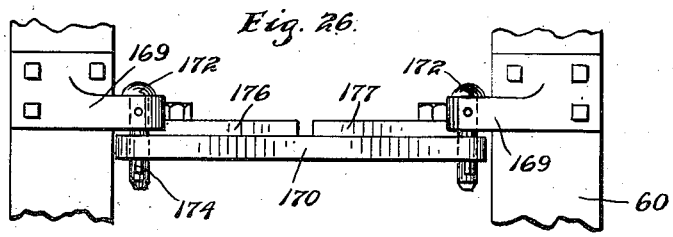
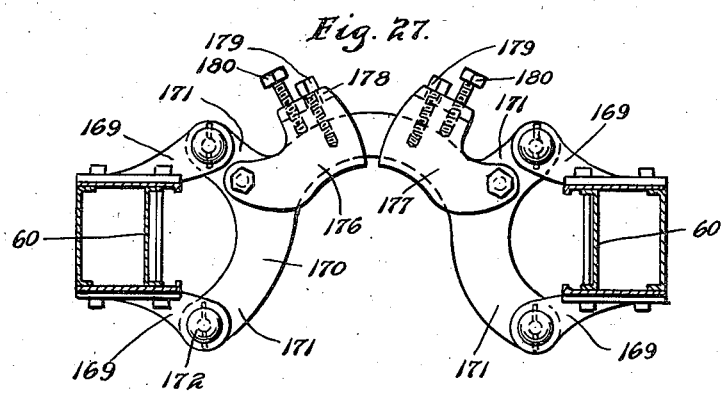
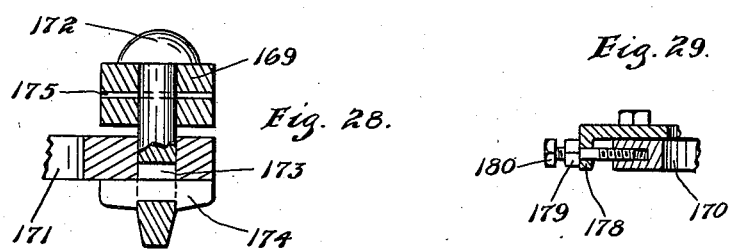
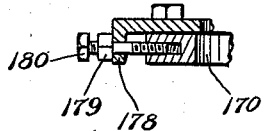
INVENTOR.
KENNEDY DOUGAN
BY HIS ATTORNEY.
James F. Williamson

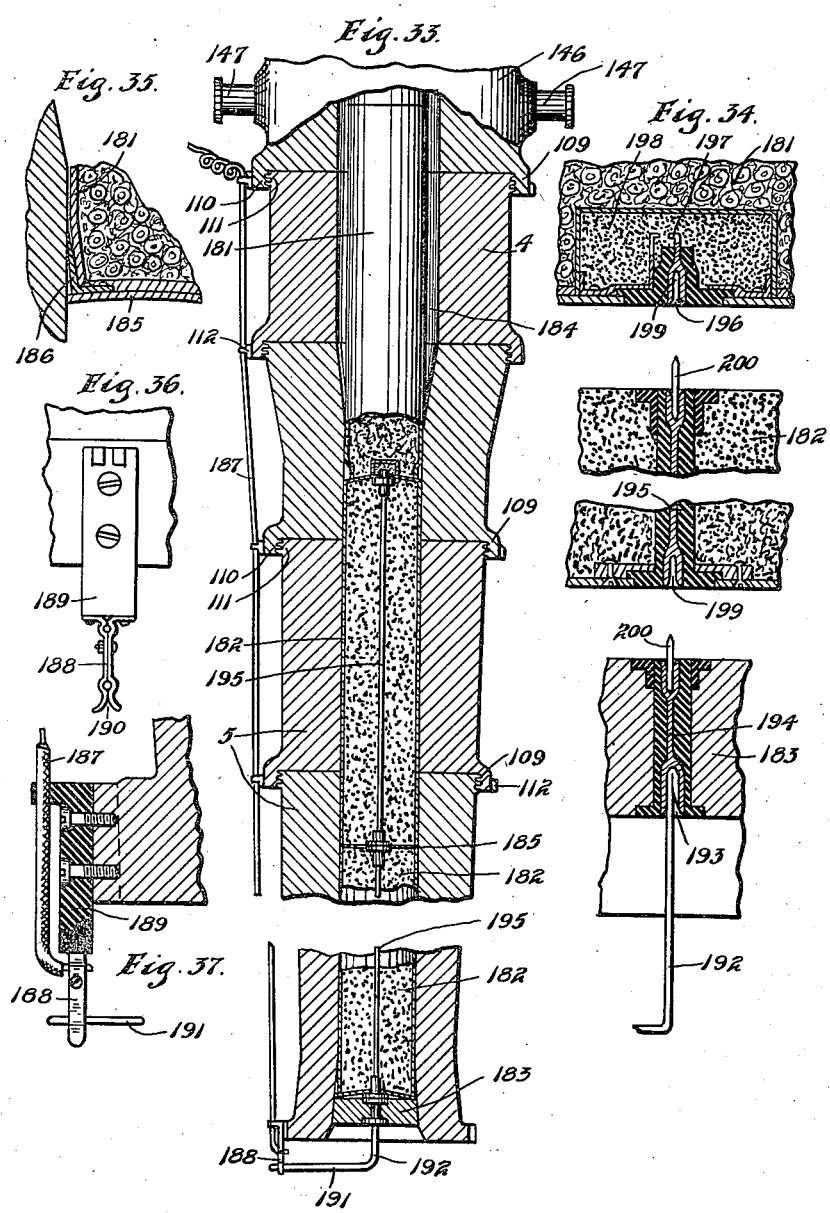

K. DOUGAN.
HEAVY ARTILLERY.
APPLICATION FILED APR. 26, 1915.
1,375,491. Patented Apr. 19, 1921.
16 SHEETS—SHEET 16.
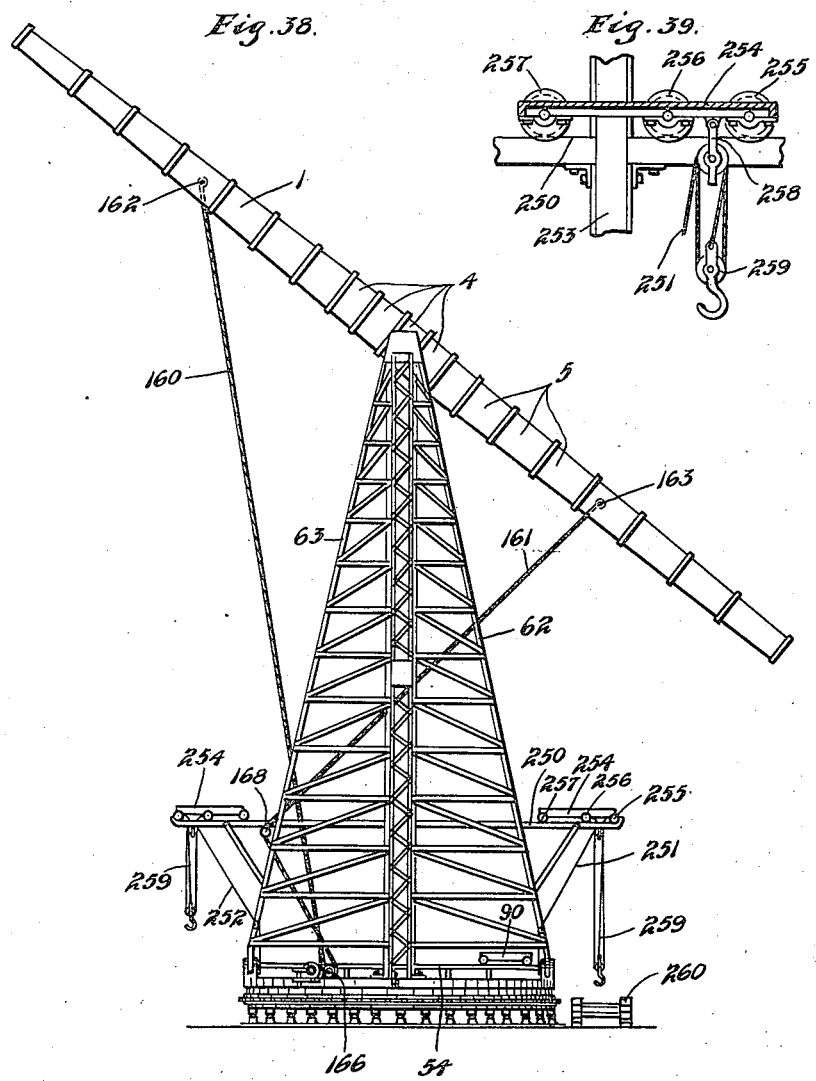
INVENTOR
KENNEDY DOUGAN.
BY HIS ATTORNEY
James F. Williamson

UNITED STATES PATENT OFFICE.

KENNEDY DOUGAN, OF MINNEAPOLIS, MINNESOTA.

HEAVY ARTILLERY.

1,375,491. Specification of Letters Patent. Patented Apr. 19, 1921.

Application filed April 26, 1915. Serial No. 23,869.

*To all whom it may concern:*

Be it known that I, KENNEDY DOUGAN, a citizen of the United States, residing at Minneapolis, in the county of Hennepin and State of Minnesota, have invented certain new and useful Improvements in Heavy Artillery, of which the following is a specification.

My invention relates to heavy artillery, and has for its object to provide a gun or cannon of large caliber which will not recoil when discharged. This gun is, therefore, particularly adapted to be fired from ships or railway cars, and may be erected on land without the provision of masonry foundations or other support than the natural earth. In use upon ships, a very great reduction in the weight of gun turrets and barbettes is made possible by the employment of my gun by reason of the reduction of the diameter of these parts. This makes it possible to correspondingly increase the weight of armor and coal of a ship and thus increase her power of resistance and radius of action.

The characteristic of the invention which enables very large guns to be fired without recoil makes the gun of my invention particularly effective on ships and railroad cars since there is no shock from the explosion, as is true with ordnance now employed, an effect of which is the tendency to disrupt the seams of the ship and the steam pipes and steam connections in boiler and engine rooms and an interference with the sighting of the smaller guns for a time after the discharge of the larger gun. Furthermore, as will hereinafter appear, my invention makes it possible to fire my gun at any elevation desired, either from ship board, cars, or upon land, thus making it effective for use against fortifications from whatever point it may be employed. If a railroad were constructed following the approximate coast line of this or any other country in which my gun might be employed (which, in time of peace, could be used for ordinary carrying purposes) and gun depots were employed at distances of a few hundred miles apart on such railway, it would be practicable with the guns of this invention mounted upon cars to mobilize such guns at any time to repel attack.

An important feature of my invention when the same is applied to ships is to be found in the fact that a comparatively small vessel may be equipped with these very heavy guns, which may be fired with perfect safety because there is no recoil. This is important because of conditions of modern warfare which makes it particularly undesirable to have too much money invested in and too much effective fighting strength limited to a single naval unit, as the modern dreadnaught battleship. The efficiency and practicability of sub-marines is now established, and it is apparent that these war vessels may put out of commission the most costly of the modern dreadnaught battleships. It is clear that if smaller units could be equipped with guns for throwing heavy projectiles that it would be far wiser to increase the number of units with heavier guns on each unit. This is entirely practicable in connection with the use of my recoilless gun. One of these guns of heavy caliber, and capable of throwing far heavier projectiles than any of the largest existing battleships, may be mounted upon a ship of a few thousand tons displacement and operate with entire safety to the ship. As will appear in the further description of the invention, this result is accomplished in a very simple manner. The gun has no breech for receiving the reaction of the explosion but is, in fact, double ended, that is, it constitutes a single tube extending in opposite directions from the load carrying portion. When loaded, it will have a shell at one side of the charge of powder, and a mass of material, such as water (on ships) or sand (on land) at the other side of the power charge. Upon discharge of the gun, the charge of waste material receives the reaction from the shell and is discharged harmlessly to the rear while the shell is shot toward its target. This waste material charge is herein referred to as an inertia charge.

The principal object of my invention is to provide a gun of the type herein described but of very large size which is formed in sections together with means for hoisting and assembling such sections and mounting the same upon a frame or derrick for carrying the assembled gun, and means for loading the gun after it is assembled. In carrying out my invention in this particular, a base framework is provided and side derricks with means for simultaneously erecting the same upon the base. Thereafter the gun sections are run upon the base between the frame member in specially devised cars, and means are provided for successively hoisting the sections into position direct from these cars, assembling the sections hoisted upon the preceding sections and hoisting the assembling gun vertically until all parts have been connected together, when the trunnion piece may be set upon the bearings provided at the top of the frame standards and the gun will be ready for action. The means for assembling and hoisting the gun and the parts for supporting the same are so arranged that a large number of men may be simultaneously employed in erecting the gun which may be effected in a very short period of time, thus making it practicable to bring these heavy guns in sections into proximity to fortifications, thereafter quickly assembling the same to reduce the forts.

The full objects and advantages of my invention will appear in connection with the detailed description thereof and are particularly pointed out in the claims.

In the drawings illustrating the application of my invention in one form,—

Figure 2:
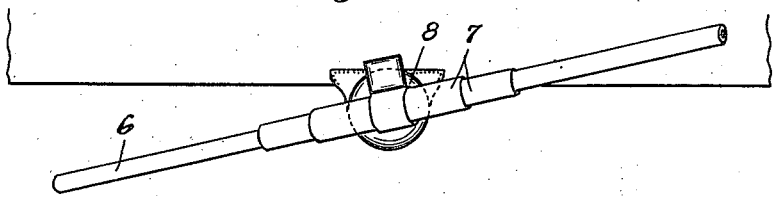
Figure 5:
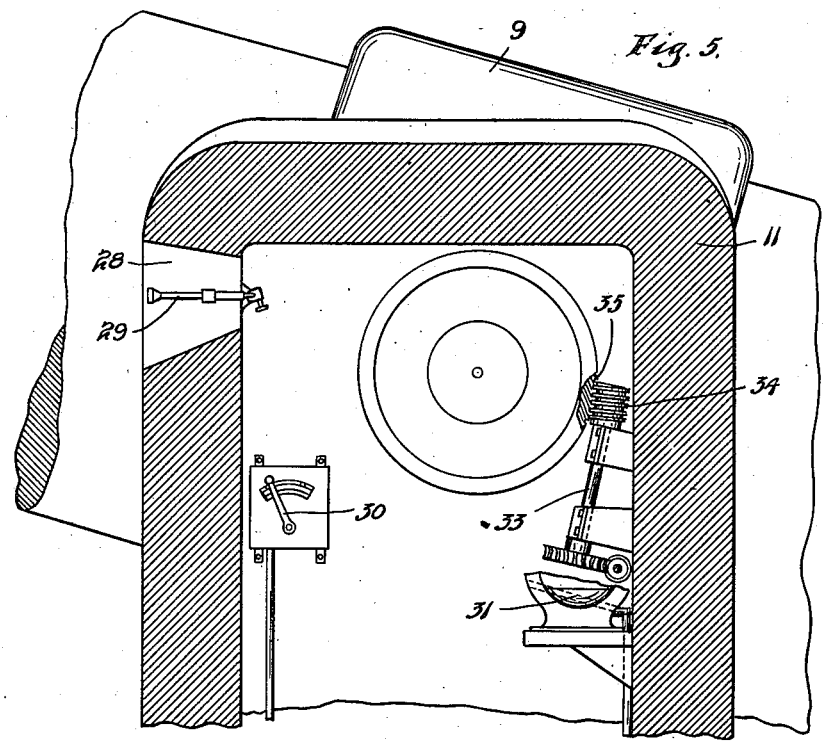
Figure 3:
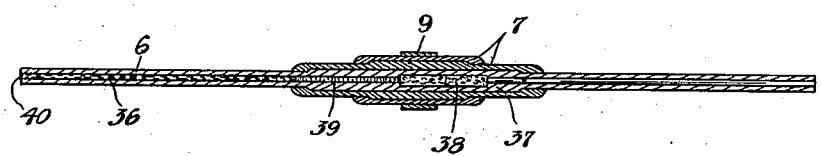
Figure 6:
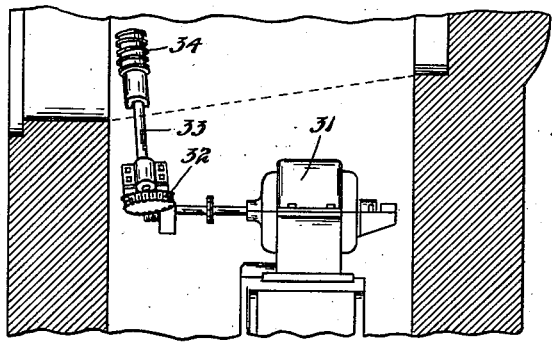
Figure 6A:
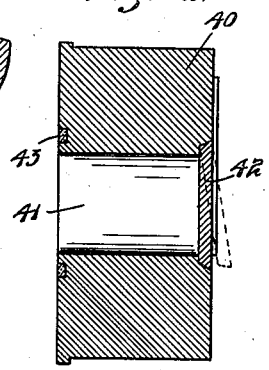
Figure 18:
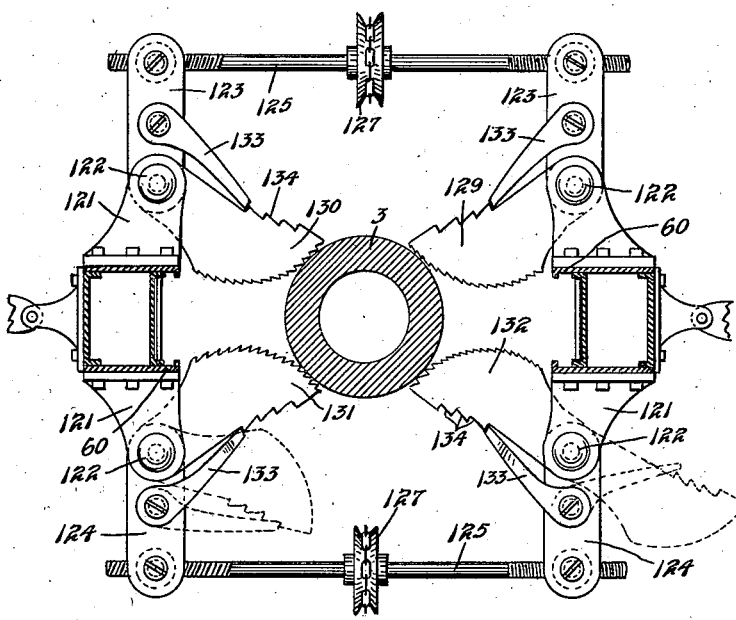
Figure 19:
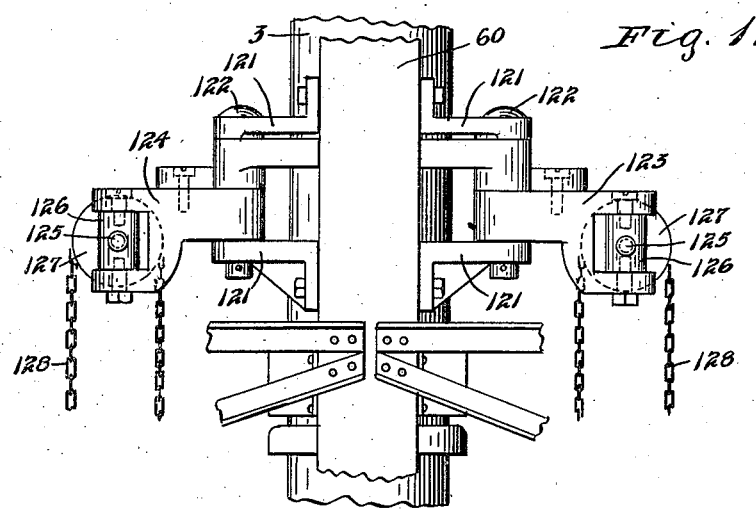

Figure 1 is an elevation view of my gun assembled upon land and ready for firing. Fig. 2 is a plan view of a naval gun embodying the improvements of my invention, showing how the same may be attached to the side of a ship. Fig. 3 is a sectional view of the gun shown in Fig. 2. Figs. 4, 5, and 6 are enlarged sectional views showing the means of securing the big gun to a vessel, together with means for operating the same. Fig. 6ª is a sectional view of the plug for closing the loading end of the gun. Fig. 7 is a plan view of the base support for the land gun. Figs. 8 and 9 are views of details of the same. Fig. 10 illustrates the manner of raising the side derrick members constituting the stand or support of the gun. Fig. 11 shows said members in position ready to receive the gun sections. Fig. 12 is a sectional elevation of the lower portion of the frame member showing the pawl device in position to be raised and a section of the hydraulic lifting member. Fig. 13 is a transverse section of the hydraulic lifting device. Fig. 14 is a view of the pawl device from below on line 14—14 of Fig. 12. Fig. 15 is a plan view of the car for bringing the parts into position to be elevated in the frame work. Fig. 16 is an elevation view showing the gun partly erected. Fig. 17 is a similar elevation view showing the gun in a more advanced state of erection. Fig. 17ª is an elevation view showing the gun completely erected and in position for receiving the load. Figs. 18 and 19 are sectional plan and side elevation views of the device for holding the gun parts against rotation while the same are being screwed together. Fig. 20 illustrates the same device in operative position, and also the means for rotating one of the sections. Fig. 21 is a sectional view showing the action of the pawl-equipped trunnion member in elevating the gun after the first pawl member has reached the end of the stand. Fig. 22 is a section through the trunnion member. Figs. 23 and 24 are side and plan views of a device to be secured to the gun for holding the same in proper alinement to receive the succeeding sections as they are assembled. Fig. 25 is a side elevational view of the parts shown in Fig. 22. Figs. 26 and 27 are plan and side views of an adjustable device for positioning the rear mouth of the gun to receive the charge. Figs. 28 and 29 are sectional detail views of the same parts. Figs. 30 and 31 are views showing the means for permitting gas exhaust through joints of the gun. Fig. 32 is a detail showing means of connecting a hose to the muzzle of the gun. Fig. 33 is a sectional view of the rear end of the gun showing the manner of assembling therein and the connections for firing the charge. Fig. 34 shows the means of making an insulated electrical connection through the cartridges of sand. Fig. 35 is a detail sectional view of the wad at the lower end of the powder cartridge which permits the same to be pushed into the gun but prevents its movement therefrom. Figs. 36 and 37 are front and side views of the means for connecting exploding circuit-wires of the load with the permanent electric wires of the gun. Fig. 38 is a view similar to Fig. 1 showing the different means of putting the sections of the gun into the gun. Fig. 39 is an enlarged detail of the car shown in Fig. 38.

Referring to Figs. 1 and 2, in the former figure the gun 1 is shown mounted upon a land supported derrick or trestle 2 and is composed of a multiplicity of front end sections 3, a series of central sections 4, and a multiplicity of rear end sections 5, each of which are integral in character and the several sections being secured together to form the assembled gun in a manner which will hereafter be pointed out. In Fig. 2, the gun comprises a central tube 6 having breech reinforcings 7 which are supported upon a turret 8, which may be mounted upon a vessel if desired. The tube 6 extends centrally through the reinforcing bands or tubes 7, as shown in Fig. 3 and about these bands is the central supporting band 9 which, in the form shown, is integrally connected with a single trunnion 10 journaled in the upper portion 11 of the turret 8. The frame of the turret is well shown in Fig. 4 in which the trunnion 10 has a conical extension 12 extending across the passageway 13 formed in the upper portion of the turret extension 11, said conical member 12 having a cylindrical portion 14 seating in a socket 15 in the other wall of turret extension 11. The turret is provided with a base 16 supported by conical roller bearings 17—18 engaging a platform 19 and a cap 20, respectively; side bearings 21 between the turret and the cap may also be employed. The portion 11 of the turret is offset, as clearly shown, so as to bring the center of gravity of the gun directly above the pivotal support of the turret. The base 16 is provided with an annular spur gear 22 which is operated by a pinion 23 on a shaft 24 driven from any source of power. A passageway 25 leads, by means of steps 26 from the interior of the vessel to the inside of the turret by which the gunner may ascend to a platform 27 where, through slot 28 in the wall of the turret extension 11, he may by means of sight 29 and controller 30 train the gun so as to direct the same for firing. By means of the controller 30 and connections therefrom not shown, the turret may be rotated and the gun may be oscillated upon trunnion 10. This last is effected by a motor 31 having the drive shaft thereof operatively connected with a worm wheel 32 on a shaft 33 which has a worm 34 meshing with a worm gear 35 on the trunnion 10.

The gun 6 is shown mounted at the edge of the vessel which makes it possible to give a very high elevation. When the same is loaded, as indicated in Fig. 3, the inertia charge 36, here shown as water, will be driven out to sea, while the shell 37 goes to its mark. The explosive charge is indicated at 38 in the enlarged explosion chamber, and bags of sand 39 may, if desired, be employed with the tube of water 36. This water is held in place by a temporary plug 40 held frictionally in the loading end of the gun. This plug is shown in detail in Fig. 6ª, and comprises a central opening 41 having an inwardly opening flap valve 42 and a rubber gasket 43 on the outside.

In loading the gun, the projectile, powder charge, and bags of sand where used are successively inserted through the loading end of the gun. The plug 40, which is preferably formed of papier mâché is then inserted fitting the loading end tightly and closing the end of the gun excepting the valve opening 41. The end of a water filling tube (not shown) is then pressed against rubber gasket 43 and water, under pressure, admitted by opening a valve. The water passes the flap valve 42 and fills the space in the gun between the plug 40 and the body of sand (or the wad behind the powder charge if no sand is employed). The valve 42 closes automatically, thereby holding in the water, and the gun is ready to be trained and fired. It is obvious that for loading the gun the breech end may be lowered into a protective loading turret on the ship, not herein shown.

Since the effectiveness in operation of my gun depends to some extent at least upon its being an extremely heavy gun, its employment for land operations necessitates special means for transporting, assembling, mounting the gun, and loading the gun after it is mounted. I have provided such means whereby my gun can readily be transported even where it is of very large caliber, up to eighteen (18) inches or larger, and can be quickly assembled and mounted and prepared for firing without the necessity of previously arranged foundations. To this end, I make the gun for land use in sections, and provide a sectional base and derrick, all of which may be conveniently moved from place to place and may be quickly assembled and erected.

A base ring 44 consists of a series of plates some two feet in width and formed in the arc of a circle, adapted to be bolted together by tie-plates 45 as shown in Fig. 7. When the base-ring 44 is assembled, it comprises a circular plate some thirty feet in outer diameter and two feet across, which engages the smooth surface of the ground throughout its circumference. It is not necessary to provide any special support for this plate. Any ordinary ground upon which men and horses can travel will readily support all the weight which is to be applied to this base, and it is only necessary to substantially level the circle of ground with which the base contacts. Upon the base 44 are set a plurality of jack-screws 46, as shown in Fig. 1, and upon these in turn is mounted an annular ring 47 having a groove 48 for receiving ball bearings 49, as indicated in Figs. 7 and 12, and having an annular spur-toothed gear 50 extending all the way around said ring. Above ring 47 and having a complemental groove for the reception of ball bearings 49 is a second ring 71 as shown in Fig. 12. The ring 71 slides in an annular passageway 72 formed between portions 73 and 74 of the main frame supporting ring 51, powerful compression springs 75 in the passageway 72 supporting the weight of the parts upon ring 71 for a purpose later to be given. The frame ring 51 is rigidly trussed and cross-braced by wide members 52 and 53, as shown in Fig. 7, and a railway track 54 is provided extending across the same. Sets of side bearing extensions 55 and of central trunnion extensions 56 are formed upon each side of the track 54. To these extensions, the gun supporting derrick members 57 and 58 are hingedly connected. These derrick sections are fabricated at one side of the central platform, as indicated in Fig. 10, being laid out upon supporting horses 59. Each of these derrick sections comprises a central guideway 60 to which is hingedly connected a wing 61, the side portions 62 and 63 of the derrick being extended in triangular form from the extended base to the top of the guideway 60 which, throughout its length, is provided with parallel side walls. The hinged sections 61 are likewise triangular extending from the base to adjacent the top of the guideways, as best shown in Fig. 11. As indicated in Fig. 10, the hinged sections 61 are formed on the horses 59 in conjunction with, and folded against, the wings 57—58.

The sets of frame members 52 in effect cross at right angles as shown in Fig. 13 and are provided with strong corner braces 76. Within the space bounded by frame members 52 and braces 76, as shown in Figs. 12 and 13, is supported an open-ended cylinder 77, a lip 78 at the top of said cylinder overlying the upper edges of members 72 and 56. This cylinder is provided with an internal cylinder 79 whereby there is formed a central cylindrical space 80 and an annular space 81 surrounding the same. A plurality of cylindrical members 82, 83, and 84 are positioned in the space 81, all being open at the bottom and telescopically arranged one within the other, the central member 82 having a tablelike top 85, as clearly shown in Fig. 12. Within the cylindrical space 80 are positioned a pair of cylindrical telescopic members 86 and 87, the member 86 being provided with a tablelike top 88. Prior to assembling the members 57 and 58 having been assembled upon horses 59, a post 64 is inserted in the space 80 so as to rest centrally with respect to space 80. Upon the top of the post are oppositely-positioned tackle blocks 65 and 66 through which run cables 67 and 68 connected at their outer ends to the derrick members 57 and 58, and at their inner ends running to a drum 69 operated by a motor, not shown. The operation of this drum has the result of elevating the derrick members 57 and 58 simultaneously into the position indicated in dotted lines whereupon the hinged members 61 are swung outwardly and secured at their bases to standards 70 provided for that purpose.

The support for the gun is now assembled and erected, as indicated in Fig. 11 and ready to receive the gun itself. As already indicated, this is formed in sections. These sections are severally brought into position between the guideways 60 and erected as will now be described.

As shown in Fig. 1, trestles 89 are provided at each side of the support for the derricks, which trestles register with track 54. Upon track 54 is a car 90 which may be run off of said track upon the trestles to a point adjacent the ground where it may receive the sections of the gun from an automobile. As shown in Fig. 38, the trestles 89 are dispensed with. In place of this a supplementary track 250 is provided which extends above the bottom support between the trestles 57 and 58, being extended outside of said trestles upon bracket supports 251 and 252. As shown in Fig. 39, the track 250 is necessarily broken at 253 where the same crosses the guideways 60. Upon the track 250 are cars 254 provided with three sets of wheels 255, 256 and 257. The wheels 255 and 256 are spaced close together, and substantially between the same is a bracket 258 upon which is supported block and tackle 259 adapted to overlie truck 260 upon which the sections may be brought into position to be hoisted. It will be apparent, therefore, as is shown in Fig. 39, that when the car 254 is brought across the gap 253 the load will be supported by wheels 255 and 256 while wheels 257 move over the gap, and the load will be supported by wheels 255 and 257 while wheels 256 move over the gap, thus making it possible to bring the load upon the block and tackle directly to the center of the space between the guideways 60.

In practice, where the construction of Fig. 38 is employed, the various sections will be hoisted from the trucks 260 by the tackle 259 and carried above the car 90 upon which the same will be deposited. If the form shown in Fig. 1 is employed the car 90 will be run directly out upon trestles 89 to a point where it may receive the sections. An advantage in employing the construction shown in Fig. 38 is that that there are no trestles to be injured in case it should be desired to fire the gun in alinement with the trestles, and the extensions of track 250 make it practicable to readily handle the sections from the motor truck upon which they are transported. It is also a fact that in the form shown in Fig. 38 the gun in practice would be loaded and fired without oscillating upon the base, which could not be the case in the form shown in Fig. 1 as the extension of the trestles 89 would thereby be destroyed. Also the hydraulic cylinder mechanism may be carried and positioned by car 254.

The car 90 is provided with a removable circular platform 91 which is provided with a central circular aperture 92 and a plurality of holes 93. Upon the top of table 85 of the member 82 in annular space 81 is bolted an annular member 94 having in its top an annular groove for receiving ball bearings 95, and upon said ball bearings 95 rests complemental annular member 96 which is adapted to be lifted into engagement with the platform 91 on car 90. At the same time, the member 86 in cylindrical space 80 is positioned to extend through opening 92 in platform 91. It will be understood that when water or oil under pressure is forced through pipe 97 into space 81, the table 85, acting as a hydraulic jack, will elevate the ring 96, and after that engages the platform 91 will elevate that and any members supported thereon. Correspondingly, when oil or water under pressure enters chamber 80 from a pipe 98, it will elevate table 88 and cause the same to extend through aperture 92 and lift any object on the platform 91 which may be positioned above aperture 92.

As shown in Fig. 12, the platform 91 has been brought into position above the hydraulic jack and detachably carries thereon a pawl-carrying yoke 99 provided with an oval central aperture 100, as shown in Fig. 14. From the ends 101 of said yoke, there depend sets of arms 102 and 103; hinged to the arms 102 are pawl-plates 104 which are held in a maximum outward position by springs 105 surrounding bolts 106 which are pivotally connected with the pawls 104 and extend through arms 103 being restrained thereby by nuts on the ends of the bolts. The first operation looking to the assembling of the gun is the elevation of the pawl yoke 99 from the position indicated in full lines in Fig. 12 to that in dotted lines. This is accomplished by forcing water or oil through pipe 97 which lifts the platform 91 and the pawl carrying yoke with it until the pawls 104 snap into the first of a series of catches 107 formed on the side of the guideways 60. The hydraulic piston then descends carrying with it the table 91 which it deposits upon the car 90, the pawls 104 in engagement with the catches 107 hold the pawl carrier up, as indicated in the first set of dotted lines in Fig. 12. The car is now run off and the muzzle end of the gun is placed upon the platform in position for erecting. Pins 108 are inserted in apertures 93 in the table 91 for holding the sections in position to rotate with said table 91. It is to be noted that, as clearly shown in Figs. 20, 21, and 33, that each of the sections 3, 4, and 5 is provided with a flange cylinder 109 threaded on the inside at 110 and adapted to receive the threaded end 111 of the complemental gun sections. Upon the outer portion of flanges 109 are lugs 112. The flanged end of the section rests upon the platform 91 and the pins 108 are inserted in holes 93 so as to engage lugs 112, thus holding the gun section to turn with the platform 91. As clearly shown in Fig. 15, the apertures 93 are positioned in double rows in staggered relation, the several corresponding members of each of the different sets of rows all falling in the circumference of circles centering at the center of platform 91, which corresponds to the vertical axis of the gun when the same is erected and held vertical upon the derrick members. In practice, the pins 108 are first set in platform 91 so as to form a circle corresponding to the circumference of the flange 109 of the particular section to be loaded upon the car. These pins, as shown at 115 in Fig. 12 are inwardly beveled which has the effect of guiding the flange member and the gun section into position as the same is lowered upon the table 91 from a crane or other hoisting device by which the gun section is transferred from the carrier to the platform 91 on car 90.

As above pointed out, the pawl-carrying member has an oval-shaped hole 100 and the muzzle section of the gun is provided at its end with an oval-shaped flange 113. The muzzle section, after being positioned on the carriage is turned so the flange 113 will pass through the opening 100 in the pawl carrying member and then turned at right angles, as indicated in Fig. 14, so that the flange extensions 113 engage over the sides of pawl-carrying yoke 99, and upon withdrawal of platform 91 the muzzle section of the gun is held suspended by the pawl carrying yoke 99. A bolt 114, threaded through a lug 115 on the muzzle section, is caused to enter a socket 116 in yoke 99, as indicated in dotted lines in Fig. 12.

It is to be noted that the movable ring 96 is provided with notches 216 adapted to receive lugs 117 at the lower side of platform 91 when the ring member is raised by the hydraulic piston 85. This rotatably connects table 91 with ring 96. The ring 96 is provided with a worm gear 118 meshing with a worm 119 on the drive shaft 120 of a motor mounted on the stationary ring member 94, all as shown in Fig. 12. The operation of this motor will, therefore, have the effect of turning ring 96 and with it table 91 and the particular gun section upon 91 which is held to rotate therewith by the pins 108 in engagement with lugs 112 on the gun section, as indicated in dotted lines on Fig. 15.

When the next section of the gun is brought in upon table 91 of car 90 and has been elevated by the hydraulic piston so as to come into engagement with the section already suspended the ring 96 is rotated and the section is rotated by the motor drive shaft 120, and the threaded portion 111 is thereby screwed into the threaded portion 110, which is held from rotating by the bolt 114 entering the pawl-carrying yoke 99.

As shown in Figs. 18, 19 and 20 in brackets 121 secured to the sides of vertical guideways 60, a short distance above the plane of the track 54 are secured in a vertical position shafts or pins 122. To these pins are journaled two pairs of relatively parallel arms 123 and 124, respectively, the members of each pair being connected by a reversely screw-threaded shaft 125 which is threaded into rollers 126 at the ends of said arms, as clearly shown in Figs. 19 and 20. The shafts 125 have shivewheels or pulleys 127 over which run chains 128 adapted to be operated from the platform of the machine. Also pivotally connected to pins 122 are a series of ratchetfaced dogs 129, 130, 131, 132, which are adapted to be connected to move in unison with arms 123, 124 by means of pawls 133 pivoted to said arms and engageable in detents 134 on the back of said dogs. After the second gun section has been secured to the first, and the pawlcarrying member 99 has passed the dogs 129 to 132, said dogs may be caused to engage the surface of the gun section and the pawls 133 are swung into position to engage a notch or tooth 134, after which by rotation of shafts 125 the dogs 129, 130, 131, and 132 may be forced inwardly into fixed gripping engagement with the gun section. The teeth of these dogs are oppositely turned and will hold the upper gun section from rotation in either direction, while the section below is being screwed upon the same by the means hereinbefore described. To prevent the ring 94 and the hydraulic piston to which it is connected from rotating during the turning operation a chain which is secured at one end to an upright support 56 is attached at the other end to a hook 136 on ring 94. When each succeeding section of the gun is assembled and pushed upwardly by the hydraulic piston, the entire gun will be elevated along the guides 60, the pawls 104 successively engaging stops 107 so as to support the portions of the gun suspended from the yoke. After a certain number of sections have been applied, a ring yoke 137 of a size to just surround the flange 109 of the last section is secured to said flange by upper and lower dogs 139 on a common stem 140, by a wrench 141, as clearly indicated in Fig. 23. The ring 137 has guide-brackets 142 and 143 extending into the guideways 60, as indicated in Figs. 23 and 24. Each of the sections is provided with a lug 144 and bolt 145, similar to the lug and bolt 115 and 114 of the muzzle section of the gun, and these bolts 145 are successively seated in sockets in the flange above for holding the lower section in proper fixed relation therewith. The ring yoke 137 in connection with the bolts and lugs thus gives means for steadying the assembled gun sections as the same are elevated vertically.

At a point substantially midway of the gun a trunnion section 146 is assembled upon the gun. This comprises trunnions 147 integrally formed on the heavy trunnion section 146. Associated with the trunnions 147 are pawl-carrying members 148 which comprise journal boxes 149 in which the trunnions 147 are journaled. The pawl-carrying members 148 have hingedly connected therewith broad plate pawls 150 which are held outwardly so as to engage catches 107 by springs 151 surrounding bolts 152 pivoted to pawls 150, said spring extending between said pawls and brackets 153 depending from members 148. The brackets 153 have thereon pulleys 154 over which run cords 155 connected, as indicated at 156, to the pawls 150 and extending into position to be reached by the operator so that when the gun is being taken down the pawls can be drawn in out of position to engage the catches 107.

As shown in Fig. 20, the side plates of the guideways 60 are cut away at 157 so as to provide room for trunnions 147 and pawl carrying member 148 to be rotated in screwing the trunnion section into the section above the same. After this has been done the section is brought into proper alinement by seating of bolt 145 in its socket in the flange ring 109 in the gun section immediately above it. The guide plate portion 158 of the pawl holder member 148 will enter the guide channel as clearly indicated in Figs. 22 and 25. The trunnion section will for the further erection of the gun thus become a guiding and sustaining member, the pawls 150 successively engaging in catches 107 until the last breech section of the gun has been assembled when said pawls will engage the final catch member 159 at the top of the gun supporting derricks 57 and 58 and the gun will then be positioned for oscillation upon its trunnions at the top of the derrick, as indicated in Figs. 18 and 21.

The gun has been assembled vertically and, of course, for training and firing the same it must be extended at an angle oblique to the horizontal, and means must be provided for controlling the positioning of the gun in its oscillation in a vertical plane on trunnions 147. This is accomplished by means of cables 160 and 161 secured to lugs 162 on forward section 3 of the gun and 163 of the rear section 5 of the gun, respectively, as clearly shown in Fig. 1. Cable 160 goes to a drum 164 secured to the parallel side portions 62 of the derrick members 57—58 and the drum 164 is operated by a motor 165 mounted adjacent said drum. Similarly cable 161 runs to a drum 166 on the opposite side 63 of derrick members 57—58 where it is operated by a motor 167. The cable 160 from drum 164 goes over a pulley 168 on the same side of the derricks as drum 167. The lugs 162 and 163 are, as shown, located on opposite sides of the gun so that the cables are removed from the path of the gun when the same is swung between the derrick members. With this arrangement it will be apparent that either end of the gun may be brought into vertical position between the derrick members. When the gun is finally erected it will, as indicated in Fig. 17, have the pawl-carrying yoke 99 at the muzzle end thereof.

This yoke is necessarily heavy weighing perhaps a ton or more. To remove the yoke, the end of the gun is inverted and the carriage platform 91 run up beneath the same when the yoke may be rotated to bring the oval hole therein along the major diameter of the end of the muzzle section of the gun when the yoke member may be lowered and removed.

Thereafter the gun is swung up with the muzzle end extended outwardly, as indicated in Fig. 1 and the means illustrated in Figs. 25, 26, 27, and 28 are assembled to hold the breech end positioned for loading so as to stand vertically for that purpose. These restraining members are secured to brackets 169 on the guide-ways 60. As shown, the abutment comprises an arc-shaped member 170 having extensions 171 supported from brackets 169 by means of bolts 172. Bolts 172 are provided with slots 173 in their lower ends for receiving keys 174 by which the member 170 is directly supported, another key or pin 175 extends through the brackets 169 and bolt 172 to hold them positioned thereon. By this means, the arc-shaped member 170 is removably held in position between the guideways 60. Pivoted upon the arc member 170 are a pair of arms 176 which are provided with flange portions 178. Through an aperture in said flange portions extends a bolt 179 which is threaded into the arc member 170. Another bolt 180 is threaded into the flange 178 and engages the edge of arc member 170. By this means the arms 176—177 may be adjusted so as to hold the gun barrel so that its axis extends vertically through the center of the loading piston 88.

The loading of the gun will be readily understood. When the breech end has been brought into engagement with the arms 176—177 as above defined the shell is brought in upon the platform 91 centrally positioned above the aperture 92 therein. The piston 88 ascending through this aperture engages the shell and forces the same up into the bore of the gun where it remains through frictional contact with the interior thereof. Then the powder charge 181 (as indicated in Fig. 33) is raised in the same way forcing the shell farther into the gun; thereafter successive cylinders of sand 182 are forced into the gun, always advancing the shell and powder charge, until when the last cylinder of sand and a closing wad 183 are brought into final position the shell will be properly positioned for discharge from the muzzle end of the gun and the powder charge will be positioned in the enlarged explosion chamber provided for that purpose. Preferably wads 185 will be inserted between each of the cylinders of sand and a special friction device 186, as shown in Fig. 35, may be applied to the lower end of the powder casing 181, if desired.

The gun is fired from an electric cable 187 secured to the side thereof and insulated from the gun and which, as shown in Fig. 37, has electrical contact with a clip device 188 which is carried by a non-conducting piece 189 secured to the gun breech. The clip 188 has a flaring mouth adapted to receive the right-angled bend 191 of a contact wire 192, the end of which is secured in a pocket 193 of an insulated conductor 194 extending through wad 183. Other similar insulated conductors 195 extend through the charges of sand 182 and an insulated conductor 196 has a sparking point 197 extending into a charge 198 of fulminate or fine gun powder positioned to ignite the charge of powder 181. Each of the conductors 194, 195, 196, is provided with sockets 199 at the point where the same is exposed to the end of the cylinders with which it is associated and removable plugs 200 are successively inserted in the sockets as the successive cylinders are lifted into position in loading the gun whereby a continuous electrical connection is provided through the several connectors, the arm 191 and the clip 190. When the charge is fired and the inertia charge made up of the cylinders of sand 185 is blown from the breech end of the gun, the arm 191 is, of course, withdrawn from the clip 190 and the parts are left in the proper position for reloading.

At the time of the explosion of the charge, especially in the breech sections 4 surrounding the powder chamber 184, there might be some tendency for the high pressure generated between the joints to tend to disrupt the securing flanges of the sections. To guard against this, I have as shown in Figs. 30 and 31, provided at the joints small channels 201 which communicate through orifices 202 with atmosphere, thus giving opportunity for any gas which may be forced into the joint between the sections to discharge freely without exerting pressure upon the flanges 109.

It may sometimes happen that a charge will be in the gun which it may be desirable to remove either because for some reason the same will not fire, or because it may have become unnecessary to fire such charge.

The charge might, of course, be removed part by part as the gun sections are taken off in disassembling the gun which is performed in a reverse manner to that of assembling and erecting it. When, however, this is not desirable, I may employ the means illustrated in Fig. 32 in which a plate 204 is bolted to the muzzle end of the gun, said plate having a single orifice 205 connected by a pipe 206 with a source of supply for oil or water under high pressure. When such liquid is forced into the bore of the gun, it will ultimately discharge the load therein by forcing it out through the open breech end.

The operation of my invention has been fully given in connection with the detailed description thereof. Its many advantages are very apparent. When this invention is employed guns of a size larger than any now in use may be mounted and safely and efficiently discharged from vessels which would be incapable of carrying anything but the smaller caliber guns at present employed. For land operations, guns of a size far greater than the largest guns now in use may be transported with as great mobility as that of the ordinary guns and erected without any advance preparations in the way of masonry or concrete foundations. Furthermore, such guns may be so elevated in respect to their mounting upon the ground that they may be fired with ease at the greatest effective angle. It is also true that owing to the recoilless character of the gun, a gun of this type of relatively small caliber may be efficiently carried upon an aeroplane or dirigible and used to shoot projectiles, thereby much increasing the effectiveness of an aerial attack.

It will be understood that the explosion chamber is located in practice at approximately the center of the gun, and need not necessarily be of larger diameter than the uniform bore extending throughout the gun from each side of the explosion chamber. It further follows that either end of the gun may be employed for the projectile receiving and firing portion of the gun. As is well-known, the wall upon the interior of a big gun from the action of the projectile and the gases about the projectile has the effect of terminating the effective life of the gun after a determined number of shots has been fired. Of course this wall is of no importance in respect to the discharge of the inertia charge, so that by reversing the gun and using for the projectile the end previously employed for the inertia charge the life of the gun can be practically doubled.

I claim:

1. A gun comprising a gun mount and a barrel, said barrel being formed of a plurality of transverse sections, means for successively securing said sections together to erect the gun, and means including said gun mount, for supporting the assembled sections while erecting the gun.

2. A sectional gun comprising a support formed of a pair of derricks with a vertical space between the same, and means for assembling the sections of the gun successively to erect the gun vertically within said space.

3. A sectional gun comprising a support formed of a pair of derricks with a vertical space between the same, means for assembling the sections of the gun successively to erect the gun vertically within said space, and means to pivotally support the erected gun from said derricks.

4. A sectional gun comprising a support formed of a pair of derricks with a vertical space between the same, means for assembling the sections of the gun successively to erect the gun vertically within said space, means to pivotally support the erected gun from said derricks, and means under the control of the operator for oscillating the gun on its pivots to train the same.

5. A sectional gun comprising a support formed of a pair of derricks with a vertical space between the same, means for assembling the sections of the gun successively to erect the gun vertically within said space, one of said sections comprising integral trunnions, and means to journal said trunnions in the derricks for supporting the gun.

6. A sectional gun comprising a support formed of a pair of derricks with a vertical space between the same, a hydraulic piston operable vertically in the lower part of the space, means to bring sections of the gun over the hydraulic piston so that the same may be lifted thereby, and means connected with the derricks and movable upwardly with the successive sections for holding the sections after the same have been lifted by the piston.

7. A sectional gun comprising a support formed of a pair of derricks with a vertical space between the same, a hydraulic piston operable vertically in the lower part of the space, means to bring sections of the gun over the hydraulic piston so that the same may be lifted thereby, and means connected with the derricks and movable upwardly with the successive sections for holding the sections after the same have been lifted by the piston, part of said last named means comprising trunnions integrally secured to one of said sections, and means to journal said trunnions in the derricks for pivotally supporting the gun.

8. A sectional gun comprising a support formed of a pair of derricks with a vertical space between the same, a railway extending across said space and a car thereon for bringing the sections between the derricks, said car having a removable top, means for lifting said top with the sections thereon, and means connected with the derricks for holding the sections lifted.

9. A sectional gun comprising a support formed of a pair of derricks with a vertical space between the same, a railway extending across said space and a car thereon for bringing the sections between the derricks, said car having a removable top, means for lifting said top with the sections thereon, means connected with the derricks for holding the sections lifted, said sections having male and female screw-threaded portions by which the same are successively secured together, and means for rotating the platform with the sections thereon for screwing the sections together.

10. A sectional gun comprising a support formed of a pair of derricks with a vertical space between the same, a railway extending across said space and a car thereon for bringing the sections between the derricks, said car having a removable top, means for lifting said top with the sections thereon, means connected with the derricks for holding the sections lifted, said sections having male and female screw-threaded portions by which the same are successively secured together, means for rotating the platform with the sections thereon for screwing the sections together, and means connected with the derricks for holding the section or sections held thereby from rotating while the section on the platform is being turned.

11. A recoilless gun comprising a barrel having an uninterrupted bore extending through the gun and opening from both ends thereof, means for pivotally supporting the gun at approximately the middle thereof consisting of a pair of derricks with a vertical space between the same, and controllable means for oscillating the gun throughout an entire circumference upon said pivotal support.

12. A recoilless gun comprising a barrel having an uninterrupted bore extending through the gun and opening from both ends thereof, means for pivotally supporting the gun at approximately the middle thereof consisting of a pair of derricks with a vertical space between the same, controllable means for oscillating the gun upon said pivotal support to bring the same into a vertical position, and means for inserting the charges into the gun through the open-ended breech hereof.

13. A recoilless gun comprising a barrel having an uninterrupted bore extending through the gun and opening from both ends thereof, means for pivotally supporting the gun at approximately the middle thereof consisting of a pair of derricks with a vertical space between the same, controllable means for oscillating the gun upon said pivotal support to bring the same into a vertical position, and a hydraulic piston for inserting the charges into the gun through the open-ended breech thereof.

14. A recoilless gun comprising a barrel having an uninterrupted bore extending through the gun and opening from both ends thereof, means for pivotally supporting the gun at approximately the middle thereof consisting of a pair of derricks with a vertical space between the same, controllable means for oscillating the gun upon said pivotal support to bring the same into a vertical position, a railway track extending across said vertical space, a car thereon for bringing the charges beneath the gun, said car having an apertured platform, and a hydraulic piston adapted to pass through the aperture of the platform and engage a charge thereon for inserting the same into the gun through the open-ended breech thereof.

15. A sectional gun comprising a support formed of a pair of derricks with a vertical space between the same, a railway extending across said space, and a car thereon for bringing the sections between the derricks, said car having a removable top, a hydraulic piston, a rotatable head on the piston adapted to engage said top, means for securing the top and head to rotate in common, and means on the piston for rotating the head.

16. A sectional gun comprising a support formed of a circular ring engaging the ground, a plurality of jack-screws on said ring, a pair of rings held by said jack-screws and relatively mounted so that one will rotate upon the other, a pair of derricks rigidly secured to the rotatable ring having a vertical space between the same, a railway extending across said space and a car thereon for bringing the sections between the derricks, means for lifting said sections between the derricks, and means connected with the derricks for holding the sections lifted.

17. A sectional gun comprising a support formed of a pair of derricks with a vertical space between the same, a railway extending across said space at a point removed from the base support of the derricks, a car on said railway having block and tackle secured thereto, said railway extending to one side of the support whereby the sections of the gun may be brought beneath the block and tackle in the transporting trucks to be lifted therefrom and carried with the car into the space between the derricks.

18. A gun comprising a number of longitudinally jointed sections, said sections having recesses formed therein at the joints and having vent openings communicating with said recesses.

19. A sectional gun comprising a plurality of endwise jointed sections, the ends of the sections being arranged in abutting relation, said sections having recesses formed therein at the abutting ends and having venting means connecting said recesses with the atmosphere.

20. A sectional gun comprising a series of sections joined together with contacting surfaces, said sections having recesses formed therein at the points of contact and having vent openings communicating with said recesses.

In testimony whereof I affix my signature in presence of two witnesses.

KENNEDY DOUGAN.

Witnesses:
F. A. WHITELEY,
H. A. BOWMAN.